United States Patent
Kim et al.

(10) Patent No.: US 6,517,804 B1
(45) Date of Patent: Feb. 11, 2003

(54) TIO₂ ULTRAFINE POWDER, AND PROCESS FOR PREPARING THEREOF

(75) Inventors: Sun-Jae Kim, Taejon (KR); Soon Dong Park, Taejon (KR); Chang Kyu Rhee, Taejon (KR); Whung Whoe Kim, Taejon (KR); Il Hiun Kuk, Taejon (KR)

(73) Assignees: Korea Atomic Energy Institute, Taejon-si (KR); Nano Chemical Co., Ltd., Seoul (KR)

( * ) Notice: Subject to any disclaimer, the term of this patent is extended or adjusted under 35 U.S.C. 154(b) by 0 days.

(21) Appl. No.: 09/610,463

(22) Filed: Jul. 5, 2000

(30) Foreign Application Priority Data

Feb. 29, 2000 (KR) .................................. 2000-10242

(51) Int. Cl.⁷ ............................................ C01G 23/047
(52) U.S. Cl. ........................................ 423/610; 423/612
(58) Field of Search ................................ 423/610, 612, 423/615, 616; 502/350

(56) References Cited

U.S. PATENT DOCUMENTS

| | | | |
|---|---|---|---|
| 4,264,421 A | | 4/1981 | Bard et al. |
| 5,776,239 A | | 7/1998 | Bruno |
| 5,821,186 A | * | 10/1998 | Collins ........................ 502/8 |
| 5,833,892 A | * | 11/1998 | Gurav et al. ................. 264/13 |
| 5,872,072 A | * | 2/1999 | Mouri et al. ................ 502/208 |
| 6,001,326 A | * | 12/1999 | Kim et al. .................. 423/598 |

* cited by examiner

Primary Examiner—Stanley S. Silverman
Assistant Examiner—Edward M. Johnson
(74) Attorney, Agent, or Firm—Bachman & LaPointe, P.C.

(57) ABSTRACT

The present invention relates to titanium dioxide powder with a large specific surface area, a method for preparing thereof, and a use of the titanium dioxide as a photocatalyst, and more particularly, discloses a method for the preparation of titanium dioxide powder comprised of the steps of adding ice pieces or icy distilled water to pure titanium tetrachloride ($TiCl_4$) to give an aqueous titanylchloride solution of 1.5 M or higher; diluting the aqueous titanylchloride with distilled water; obtaining precipitates from the diluted aqueous titanylchloride solution by standing for 2–20 hours at 15–70° C.; and filtering, washing and drying the above precipitates to give downy hair-shaped $TiO_2$ powder with a specific surface area of 130–200 m²/g. The titanium dioxide powder of the present invention shows high photocatalytic activity, so that it can be used to decompose environmental organic pollutants by taking advantage of an advanced oxidation process (AOP) in which pollution-free energy, such as solar energy is utilized as a driving force. The method allows the formation of a crystalline phase of titanium dioxide at room temperature without a high temperature and high pressure process and enjoys an economical advantage of being low in production cost.

11 Claims, 3 Drawing Sheets

TIO₂ ULTRAFINE POWDER, AND PROCESS FOR PREPARING THEREOF

BACKGROUND OF THE INVENTION

1. Field of the Invention

The present invention relates to titanium dioxide powder with a large specific surface area, a method for preparing thereof, and the use of titanium dioxide as a photocatalyst, and more particularly, discloses a method for the preparation of downy hair-shaped titanium dioxide powder comprised of the steps of adding ice pieces or icy distilled water to a pure titanium tetrachloride (TiCl$_4$) to give an aqueous titanylchloride solution of 1.5 M or higher; diluting the aqueous titanylchloride with distilled water; obtaining precipitates by a homogeneous precipitation process at low temperatures; and filtering, washing and drying the above precipitates to give the downy hair-shaped TiO$_2$ powder with a specific surface area of 130–200 m$^2$/g.

2. Description of the Prior Art

Recent industrial progress has given rise to a great increase in pollutants and solutions for the aggravating environmental pollution. In the past, tremendous efforts have been made to solve the environmental pollution simply through The purification and discharge of pollutants. However, present research is being directed-towards the complete decomposition of pollutants.

Recently, an advanced oxidation process (AOP) has been developed in which environmental organic pollutants are decomposed into carbon dioxide (CO$_2$) and water (H$_2$O) in the presence of a semi-conductive photocatalyst with use of pollution-free energy, such as solar energy, as a driving force. A photocatalyst absorbing particular wavelength ranges of solar light causes chemical reactions to decompose environmental pollutants completely at room temperature. An advanced oxidation Process employing photocatalyst for decomposing pollutants is efficiently carried out to give no environmental pollutants, and the process is so simple that they can obtain a large economical favor. In addition, a photocatalyst is used for the recovery of heavy metal and precious metal ions and has found numerous applications in various fields such as water purification, hydrogen synthesis through water decomposition, wastewater treatment, deodorization and sterilization.

Materials suitable for use as a photocatalyst are required to be easily activated by light and to be chemically stable. That is, semi-conductive photocatalyst particles need to be ultrafine, and further chemical reactivity thereof to other materials must be low. In addition, an appropriate narrow band gap is essentially prerequisite to photocatalysts because they are activated by the visible or ultraviolet wavelength range, and the recombination rate of the electron-hole pairs must be slow for sufficient activity. Particularly, the materials must not be expensive for industrial applications. Commercially available photocatalyst powders show weak photoactivity under employed light intensities, which limits various applications.

Titanium dioxide, used as a photocatalyst, has two phases of crystalline structure, anatase phase and rutile phase. Particularly, titanium dioxide with anatase phase has been known to be highly stable and show excellent photoactivity together with a band gap from 3.0 to 3.2 eV. A reasonable band gap allows the formation of electron-hole pairs by absorbing light of a wavelength lower than 400 nm, reacting with toxic organic materials. The holes make strong oxidants, OH radicals, which may decompose toxic organic materials or oxidize metal ions, while the resultant electrons take part in a reduction reaction. P-25, a brand name of titanium dioxide powder, manufactured by Degussa Co., Germany, which has been evaluated as being the most active among the presently available photocatalysts, shows insufficient photoactivity under a practically employed light intensity of tens of watts, so that it is limited for practical application.

Titanium dioxide powders have been conventionally prepared by a sol-gel method and a chloride process. The sol-gel method is, however, difficult to continuously perform and incurs a high production cost because additional heat treatments must be adopted and alkoxide, a raw material, is very expensive. The chloride process, which is at present commonly used, also suffers from disadvantages: it needs a particular apparatus owing to its high temperature and pressure reaction. This process requires an additional protective facility because of the corrosive gases (Cl$_2$, HCl) produced during the reaction, leading to higher production costs. In addition, special devices are employed for applying electric fields or controlling the reactant mixing ratio to control the shape and size of TiO$_2$ particles. Titanium dioxide P-25, manufactured by Degussa Co., Germany, is well known to be produced using the chloride process and not desirable in terms or production cost and photocatalytic properties.

To overcome the above problems encountered in prior arts, the present inventors prepared titanium dioxide by a homogeneous precipitation process at low temperatures after diluting aqueous titanylchloride with distilled water, ammonia water or an aqueous solution of sulfate ions. Titanium dioxide has a crystalline phase in a downy hair shape with a large specific area and shows high photocatalytic activity.

SUMMARY OF THE INVENTION

An object of the present invention is to provide a downy hair-shaped titanium dioxide powder, which has a large specific surface area and has superior photocatalytic activity.

Another object of the present invention is to provide a method for preparing the above titanium dioxide powder by a homogeneous precipitation process at low temperatures.

A further object of the present invention is to use the above titanium dioxide powder as a photocatalyst.

DETAILED DESCRIPTION OF THE INVENTION

Figure 1:
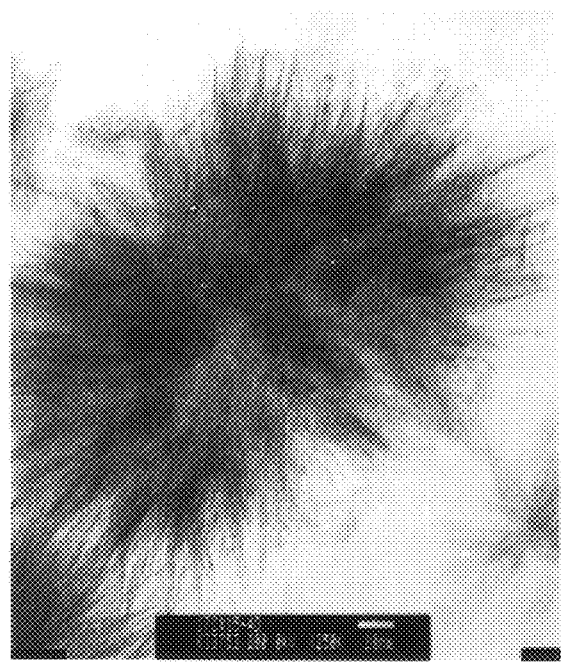
FIG. 1 is a scanning electron microscope photograph showing a crystalline phase of the titanium dioxide precipitate according to the present invention.

In the present invention, downy hair-shaped titanium dioxide powder with a large specific surface area is prepared.

In addition, the present invention provides a method for preparation of the above titanium dioxide powder comprised of these steps of: (1) adding ice pieces or icy distilled water to pure titanium tetrachloride ($TiCl_4$) to give an aqueous titanylchloride solution of 1.5 M or higher (step 1); (2) diluting the aqueous titanylchloride solution with distilled water to a Ti ion ($Ti^{4+}$) concentration of 0.1–1.2 M (step 2); (3) obtaining precipitates from the diluted aqueous titanylchloride solution by standing for 2–20 hours at 15–70° C.; and (4) filtering, washing and drying the titanium dioxide precipitates.

Titanium tetrachloride used in the present invention is very difficult to quantify since it has high vapor pressure at room temperature and tends to vigorously react with moisture in the air. It is also difficult to know whether the form in the aqueous solution state is titanium tetrachloride or titanylchloride. Therefore, a stable aqueous solution with a constant titanium ion concentration prepared by diluting an unstable titanium tetrachloride-undiluted solution is first required to quantitatively carry out precipitation reactions and to inhibit the reaction of titanium chloride with moisture in the air.

For these reasons, in step 1 of the present invention, a transparent and stable titanylchloride solution with a titanium ion concentration higher than 1.5 M is prepared by adding ice pieces of distilled water or icy distilled water to undiluted titanium tetrachloride of high purity via a yellow and unstable Intermediate solid, and the prepared titanylchloride solution is kept at room temperature to use as a starting material of the precipitation reaction. If titanium tetrachloride itself is used with a volume ratio to prepare the starting stock solution, its vigorous reaction with water increases during preparation of the titanylchloride solution, with a titanium ion concentration higher than 1.5 M. Thus, the loss of titanium tetrachloride increases and the reproducibility of the reaction falls off. This result makes it difficult to control the amount of reactant and predict the productive efficiency of the final product. Therefore, in the present invention, a stable titanylchloride solution is first prepared by adding a lesser amount of water than the quantitative amount to titanium tetrachloride and an accurate concentration of the starting material can be given by determining the titanium ion concentration of the prepared solution. This makes it easy to predict the productive efficiency of the final product and keep the reproducibility of this invention.

In addition, in the present invention, the titanylchloride solution prepared by adding water to titanium tetrachloride is used for the precipitation reaction. When adding water to titanium tetrachloride, it is important not to cause the reaction slowly, but to add a lesser amount of water to the titanium tetrachloride than the stoichiometric amount. Even if hydrolysis takes place during the reaction, it is not hydrolysis in the apparent reaction, therefore the titanylchloride solution prepared in the present invention does rot contain insoluble hydroxide and has transparent characteristics from the beginning. Titanylchloride, prepared by the following scheme I, is still more stable in the water than titanium tetrachloride and can be kept in a stable stock solution state at room temperature through stabilizing after the preparation reaction and adjusting the $Ti^{4+}$ concentration of this solution to higher than 1.5 M.

$TiCl_4+H_2O=TiOCl_2+2HCl$                                  Scheme I

The solution also remains stable and transparent even though a large amount of water is added for supplement within a short time as long as the concentration of $Ti^{4-}$ in the solution is adjusted to higher than 1.5 M. That is, the hydrolysis producing $Ti(OH)_4$ does not occurs even if hydrolysis occurs by adding water.

In step 2, the concentration of $Ti^{4+}$ in the above titanylchloride solution at a concentration higher than 1.5 M is diluted to a titanylchloride solution with a $Ti^{4-}$ concentration of 0.2 to 1.2 M by adding water, which is used as a starting material. This diluted solution is sensitive to form precipitates and gives high productive efficiency of the final product. Additionally, the diluted solution prevent the loss of titanium ions, which results from a high vapor pressure of titanium tetrachloride during the reaction with water, so the productive efficiency of the final product can be determined by the theoretical volume ratio.

However, if the concentration of $Ti^{4-}$ in the titanylchloride solution is higher than 1.2 M, even during the diluting process of the present invention, crystalline precipitates do not form even after 10 days at temperatures lower than 100° C. Moreover, if the concentration of $Ti^{4+}$ in the titanylchloride solution is lower than 0.2 M, great amounts of the nuclei of the titanium dioxide precipitates are formed at the same time, but the growth of the nuclei does not occur in the same time compared to the precipitation conditions with optimized $Ti^{4-}$ concentrations, thus the size of the formed titanium dioxide particles at that time is lower than 0.05 μm and the yield of the final product is also lower than 30% (v/v) by usual filtration using filter paper and centrifugation.

In this dilution step, ammonia water or aqueous sulfate ions may be further added.

Ammonia water (diluted 25%) is preferably added in an amount of 1.4–3.7% (v/v). The aqueous titanylchloride solution in step 2 is in a strong acidic state with a large quantity of hydrochloric acid. The addition of ammonia water (diluted 25%) in an amount of 1.4–3.7% (v/v) to the titanylchloride solution results in the formation of unstable hydroxides, which are easily dissolved or dispersed in the solution.

When precipitation is allowed in the presence of fine precipitates, which are generated by stirring and dispersing the solution containing the unstable hydroxides, the yield of titanium dioxide is greatly improved compared with that of simple heating processes. In fact, the reaction time necessary for the precipitation can be reduced to two-thirds. Further, the particle size distribution of the resulting titanium dioxide powder is brought into a very narrow range.

When an aqueous solution of sulfate ions ($SO_4^{2-}$) is used, it is preferably added at a concentration of 0.08 M or less. For example, more than 0.08 M of sulfate ions results in coarse precipitates unsuitable as a photocatalyst owing to low photocatalytic activity. Less than 0.03 M of sulfate ions leads titanium dioxide with rutile phase only. Within the range of 0.03–0.08 M of sulfate ions, the ratio of anatase phase/rutile phase of the titanium dioxide powder can be controlled by the concentration of sulfate ions. Preferable examples suitable for use as the aqueous solution containing sulfate ions include aqueous solutions of $H_2SO_4$, $TiOSO_4$, $FeSO_4$ and $CuSO_4$.

In step 3, the precipitates are formed by a homogeneous precipitation process at low temperatures. The aqueous titanylchloride solution obtained in step 2 is allowed to stand for 2–20 hours at 15–70° C. for precipitation. It takes a certain period of time for the precipitates to form, which indicates the existence of an activation barrier against the precipitation. In this case, when adding water to provide OH⁻ ions, the aqueous solution is increased in acidity by crystallization, which occurs with synchrony to the hydrolysis of the precipitation, such that precipitates start to form.

Secondary titanium dioxide particles, which result from the homogeneous aggregation of primary particles, show relatively uniform size distributions in the size range of 0.05–0.5 μm with a mono-dispersed spherical shape as the precipitation temperature increases. In order to obtain secondary, mono-dispersed titanium dioxide particles with sizes less than 0.1 μm, for example, an aqueous titanylchloride solution of an appropriate concentration is subjected to precipitation at 25° C. or less or an aqueous titanylchloride solution of a lower $Ti^{4+}$ concentration, e.g. 0.2–0.4 M, is subjected to precipitation at a temperature larger than a middle range, e.g. 50–70° C. for 12 hours.

The ratio between the rutile and anatase phase, to either of which the titanium dioxide belongs, can be controlled by adding water to dilute the titanylchloride solution or by adding some ammonia water and then an aqueous sulfate ion solution to the titanylchloride solution, according to the condition in step 2. For instance, when adding water for dilution only or adding ammonia water only, a rutile phase of titanium dioxide is formed. On the other hand, when the diluted titanylchloride solution is further added with a solution of sulfate ions in water, a rutile phase of titanium dioxide is formed if the sulfate ion concentration is below 0.03 M, and an anatase/rutile mix phase or an anatase phase of titanium, dioxide if the sulfate ion concentration is controlled within the range of 0.03–0.08 M.

Titanium dioxide prepared through the above procedure is found to have a shape of downy hairs, with ultrafine primary particles with a size less than 20 nm aggregate, as observed with a transmission electron microscope. It was also found that the titanium dioxide of the present invention has a specific surface area of 130–200 m²/g, which is 2–5 folds larger than that of conventional titanium dioxide, which has a specific surface area of 40–70 m²/g.

In step 4, the titanium dioxide formed is filtered, washed and dried. The titanium dioxide was filtered by using a filter paper with a pore size of 0.1 μm or greater, washed with a washing solution, and the washed titanium dioxide was dried to afford a rutile phase of mono-dispersed, ultrafine $TiO_4$ powder.

An aqueous, alkaline halide solution of 0.1 M or higher in order to prevent the deflocculation of the precipitates during washing is suitable for use as the washing solution. The alkaline halide compound remaining on the precipitates which have been washed with the aqueous, alkaline halide solution to the neutral state can be completely decomposed by washing with pure water several times. This step is very convenient as well as highly efficient.

When such an alkaline halide compound is employed for filtration and washing, chilled water may be readily used without causing any deflocculation such that the filtration car be conducted rapidly. Examples suitable for use as the alkaline halide include sodium chloride (NaCl) and potassium chloride (KCl).

Drying conducted for 10–40 hours at temperatures lower than 300° C. is preferred. Too high temperatures allow the growth of primary particles, resulting in a reduction in the photocatalytic activity of titanium dioxide powder.

The titanium dioxide powder of the present invention, as mentioned above, is of a downy hair shape with a large specific surface area so that it can be efficiently used as a photocatalyst. While conventional titanium dioxide powder (e.g., P-25, Degussa Co., Germany), which is limited in practical utility because of weak photocatalytic activity under UV rays at a light intensity of tens of watts, the titanium dioxide powder of the present invention can be variously applied in industrial applications because of a photocatalytic activity 1.5–4 folds higher than that of conventional titanium dioxide powder.

A better understanding of the present invention may be obtained in light of the following examples which are set forth to illustrate, but are not intended to be in any way limiting to the scope of the invention as claimed.

EXAMPLE I

Preparation of Titanium Dioxide Powder I

To 100 g of highly pure titanium tetrachloride, chilled below 0° C., not more than 350 g of distilled water cooled below 0° C. or its ice pieces were slowly added to give an aqueous titanylchloride solution with a $Ti^{4+}$ concentration of 1.5 M or higher, which was then stabilized by stirring. The aqueous titanylchloride solution was further added with distilled water to the dilution containing 0.7 M of titanium ions ($Ti^{4+}$), slowly stirred and allowed to stand for four hours in a water bath maintained at 50° C. to form precipitates. In order to remove chlorine ions from the precipitates, they were filtered by use of filter paper with a pore size of 0.2 μm and washed many times with distilled water containing 0.1 M of sodium chloride. Finally, the precipitates were washed with distilled water and alcohol to afford a rutile phase of a mono-dispersed titanium dioxide powder.

With reference to FIG. 1, there is a scanning electron microscope (SEM) photograph of the titanium dioxide prepared in Example I. As shown in FIG. 1, the titanium dioxide powder in this example was mono-dispersed with a downy hair shape, having primary particles with a size of about 10 nm. Scanning electron microscopic analysis showed that the titanium dioxide powder ranges, in particle size, from 0.1 to 0.4 μm with an average size of 0.25 μm and had a specific surface area of 150–200 m²/g.

Figure 2:
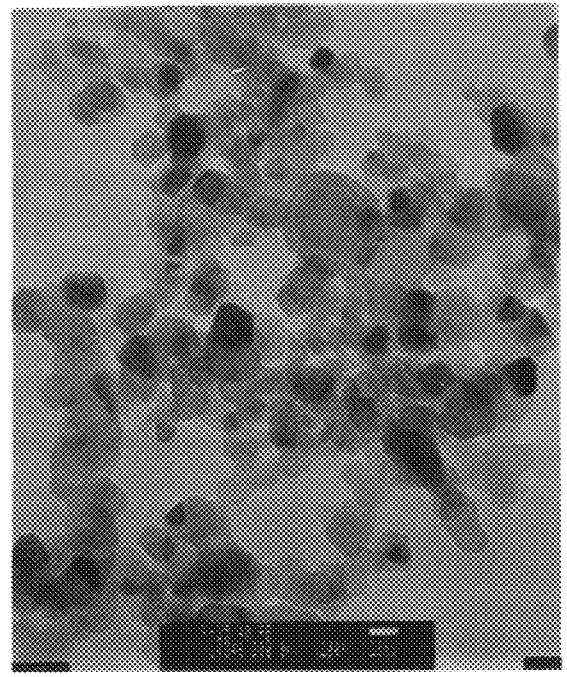
FIG. 2 is a scanning electron microscope photograph showing a crystalline phase of a conventional titanium dioxide powder P-25, Degussa Co., Germany)

With reference to FIG. 2, there is a scanning electron microscope photograph of a commercially available titanium dioxide powder (P-25, Degussa Co., Germany). As seen, this conventional titanium dioxide powder was of a spherical shape with a specific surface area ranging from 40 to 70 m²/g.

EXAMPLE II

Preparation of Titanium Dioxide Powder II

To 100 g of highly pure titanium tetrachloride, chilled below 0° C., not more than 350 g of distilled water cooled below 0° C. or its ice pieces were slowly added to give an aqueous titanylchloride solution with a $Ti^{4+}$ concentration of 1.5 M or higher, which was then stabilized by stirring. The aqueous titanylchloride solution was further added to distilled water to a dilution containing 0.7 M of titanium ions ($Ti^{4+}$), followed by the addition of 2.8% (v/v) of ammonia water (diluted 25%) to give an unstable hydroxide. The hydroxide, which was formed by the addition of ammonia water, was thoroughly dispersed by stirring the solution for 30 min, to such a degree that it was not discriminated with the naked eye, after which he dispersed solution was allowed to stand for four hours in a water bath maintained at 50° C. to form precipitates. In order to remove chlorine ions from the precipitates, they were allowed to pass through filter paper with a pore size of 0.2 μm and washed many times with distilled water containing 0.1 M sodium chloride. Finally, the precipitates were washed with distilled water and alcohol to give the rutile phase of mono-dispersed titanium dioxide powder.

Scanning electron microscopic analysis showed that the titanium dioxide powder was of a downy hair shape with a specific surface area of 160–190 $m^2/g$.

EXAMPLE III

Preparation of Titanium Dioxide Powder III

To 100 g of highly pure titanium tetrachloride, chilled below 0° C., not more than 350 g of distilled water cooled below 0° C. or its ice pieces were slowly added to give an aqueous titanylchloride solution with a $Ti^{4-}$ concentration of 1.5 M or higher, which was then stabilized by stirring. The aqueous titanylchloride solution was further added to distilled water to a dilution containing 0.7 M of titanium ions ($Ti^{4-}$) and then, with $TiOSO_4$ to a final concentration of 0.05 M, stirred, and allowed to stand for four hours in a water bath maintained at 50° C. to form precipitates. In order to thoroughly remove chlorine ions from the precipitates, they were allowed to pass through filter paper with a pore size of 0.2 μm and washed many times with distilled water containing 0.1 M sodium chloride. Finally, the precipitates were washed with distilled water and alcohol to give the rutile phase of mono-dispersed titanium dioxide powder.

The powder was found to be in a mixture of a downy hair shape and a spherical shape as observed with an scanning electron microscope. The scanning electron microscopic observation also showed that the powder was mainly in the anatase phase with a specific area of 130–150 $m^2/g$.

EXPERIMENTAL EXAMPLE I

Photocatalytic Activity of Titanium Dioxide Powder I

After being dried at 70° C. for 20 hours, the titanium dioxide powder prepared in Example I was analyzed for photocatalytic activity. To distilled water containing 200 ppm of Pb-EDTA, the titanium dioxide powder was added in amounts of 0.5, 1, 2, 4 and 6 g/L. The solutions thus obtained were subjected to photocatalysis reaction under external UV rays at a light intensity of 15 W for one hour. Thereafter, the solutions were passed through filter paper with a pore size of 0.2 μm, followed by measuring the concentration of the photo-recovered Pb ions by means of an atomic absorption spectrometer. The amount of Pb recovered by the titanium dioxide powder is plotted in FIG. 3. For comparison, commercially available titanium dioxide powder (P-25, Degussa Co., Germany) was used at same amount as the control.

Figure 3:
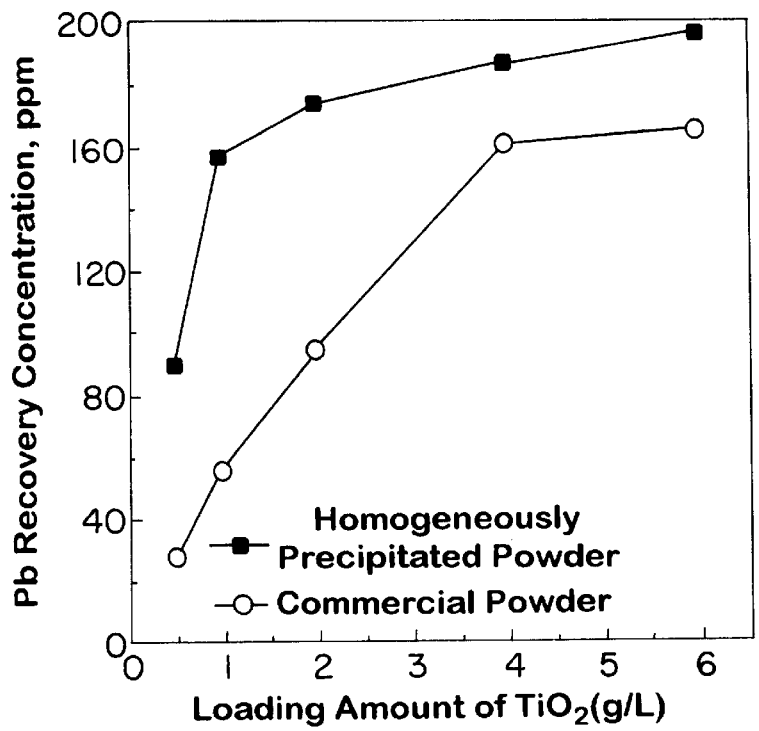
FIG. 3 is a graph in which Pb recovery concentration is plotted for the present titanium dioxide powder (-■-) and the conventional titanium dioxide powder(-○-) with the loading amounts of titanium dioxide powder.

As apparent from FIG. 3, the homogeneously precipitated powder according to the present invention was 1.5–4 folds more effective in recovering Pb from Pb-EDTA than was the commercially available titanium dioxide powder. Therefore, it can be seen that the titanium dioxide powder of the present invention shows higher photocatalytic activity within a shorter period of time and at smaller amounts than does the control.

EXPERIMENTAL EXAMPLE II

Photocatalytic Activity of Titanium Dioxide Powder II

After being dried at 100° C. for ten hours, the titanium dioxide powder prepared in Example I was analyzed for photocatalytic activity. Titanium dioxide powder was added at an amount of 2.0 g/L to distilled water containing 150 ppm of Pd-EDTA. The solution thus obtained was subjected to photocatalysis reaction under external UV rays at a light density of 15 W. Thereafter, the solution was passed through filter paper with a pore size of 0.2 μm, followed by measuring the concentration of non-recovered Pb ions remaining in the solution by means of an atomic absorption spectrometer every ten min. The measurements are plotted with irradiation time in FIG. 4. For comparison, commercially available titanium dioxide powder (P-25, Degussa Co., Germany) was used at the same amount as the control.

Figure 4:
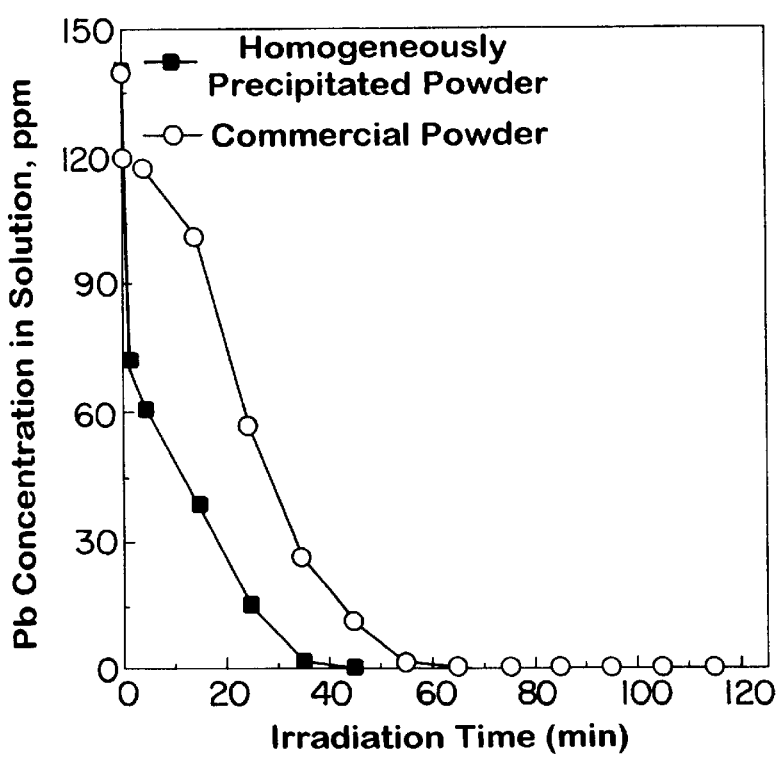
FIG. 4 is a graph in which the Pb concentration in the solution is plotted for the present titanium dioxide powder (-■-) and the conventional titanium dioxide (-○-) with the time period of UV irradiation of Pb-EDTA solutions.

As apparent from FIG. 4, Pb ions were thoroughly recovered after 35 min of the irradiation by the homogeneously precipitated powder according to the present invention whereas complete photo recovery by the control was achieved after 55 min irradiation. In consequence, the titanium dioxide powder of the present invention is 1.5 fold higher in the photocatalytic activity than commercially available titanium dioxide powder.

EXPERIMENTAL EXAMPLE III

Photocatalytic Activity of Titanium Dioxide Powder III

After being dried at 150° C. for ten hours, the titanium dioxide powder prepared in Example II was analyzed for photocatalytic activity. Titanium dioxide powder was added at an amount of 2.0 g/L to distilled water containing 100 ppm of 4-chlorophenol. The solution thus obtained was subjected to photocatalysis reaction under external UV rays at a light density of 15 W. Thereafter, the solution was passed through filter paper with a pore size of 0.2 μm, followed by measuring the concentration of non-degraded 4-chlorophenol remaining in the solution by means of an atomic absorption spectrometer every ten min. The measurements are plotted with the irradiation time in FIG. 5. For comparison, commercially available titanium dioxide powder (P-25, Degussa Co., Germany) was used at the same amount as the control.

Figure 5:
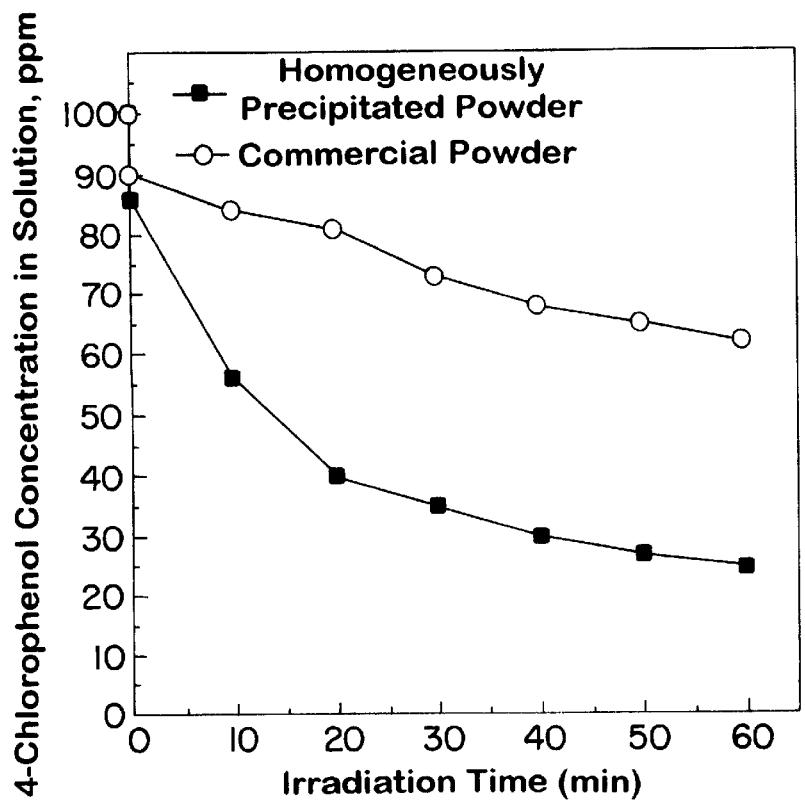
FIG. 5 is a graph in which the concentration of non-degraded 4-chlorophenol in the solution is plotted for the present titanium dioxide powder (-■-) and the conventional titanium dioxide (-○-) with the time period of the UV irradiation of 4-chlorophenol solutions.

As apparent from FIG. 5, the titanium dioxide powder of the present invention is at least twice as high in photocatalytic activity as commercially available titanium dioxide.

EXPERIMENTAL EXAMPLE IV

Photocatalytic Activity of Titanium Dioxide Powder IV

After being dried at 70° C. for 20 hours, the titanium dioxide powder prepared in Example III was analyzed for photocatalytic activity. Titanium dioxide powder was added at an amount of 2.0 g/L to distilled water containing 100 ppm of Cu-EDTA. The solution thus obtained was subjected to photocatalysis reaction under an external UV beam at a light density of 15 W. Thereafter, the solution was passed through filter paper with a pore size of 0.2 μm, followed by measuring the concentration of non-recovered Cu ion remaining in the solution by means of an atomic absorption spectrometer every ten min. The measurements are plotted with the irradiation tome in FIG. 6. For comparison, commercially available titanium dioxide powder (P-25, Degussa Co., Germany) was used at the same amount as the control.

Figure 6:
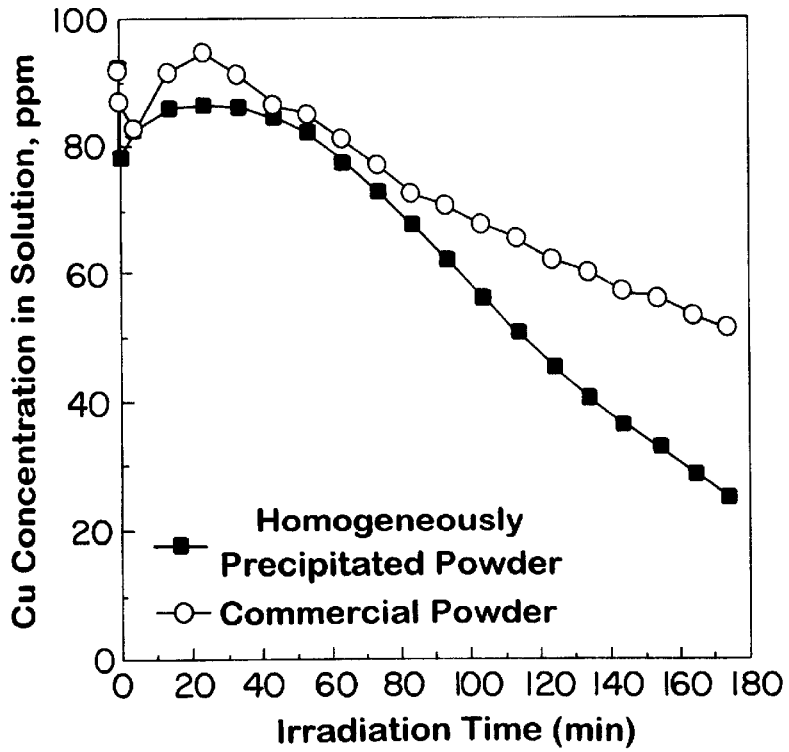
FIG. 6 is a graph in which the Cu concentration in the solution is plotted for the present titanium dioxide powder (-■-) and the conventional titanium dioxide (-○-) with the time period of the UV irradiation of Cu-EDTA solutions.

As apparent from FIG. 6, the titanium dioxide powder of the present invention is at least 1.2 fold higher in photocatalytic activity than commercially available titanium dioxide.

As previously described, titanium dioxide powder according to the present invention is of a downy hair shape with a specific surface area 2–4 folds greater than that of conventional titanium dioxide powder products. With these excellent properties, the homogeneously precipitated powder of the present invention is superior in photocatalytic activity even under a light Intensity of tens of watts. In addition, the method for preparing titanium dioxide powder by a homogeneous precipitation process at low temperatures is simpler and lower in production cost, compared with other conventional methods. Another advantage of the preparation method in the present invention is that it is useful for doping via co-precipitation by virtue of its capability of forming crystalline phases at room temperature. The method for preparation in the present invention, which is featured in applying parameters in some steps of the preparation, affords titanium dioxide powder that is superior to preexisting ones in the photocatalytic activity under practical light intensities. Therefore, the titanium dioxide powder of the present invention can be used to effectively decompose environmental organic pollutants by taking advantage of an advanced oxidation process in which pollution-free energy such as solar energy is utilized as a driving force. There are also numerous applications in various industrial fields, including water purification, hydrogen synthesis through water decomposition, wastewater treatment, and deodorization and sterilization.

What is claimed is:

1. A downy hair-shaped titanium dioxide ($TiO_2$) powder with a specific surface area of 130–200 $m^2/g$.

2. A method for preparing the titanium dioxide powder of claim 1, comprising:
   1) adding ice pieces or icy distilled water to pure titanium tetrachloride ($TiCl_4$) in an amount of less than the stoichiometric amount to give an aqueous titanylchloride solution of 1.5 M or higher (step 1);
   2) diluting the aqueous titanylchloride solution with distilled water to a Ti ion ($Ti^{4+}$) concentration of 0.1–1.2 M (step 2);
   3) obtaining precipitates of titanium dioxide from the diluted aqueous titanylchloride solution by standing for 2–20 hours at 15–70° C.; and
   4) filtering, washing and drying the above titanium dioxide precipitates to provide the titanium dioxide powder.

3. The method according to claim 2, further comprising adding ammonia water (25% diluted) at an amount of 1.4–3.7% (v/v) to the aqueous titanylchloride solution to form unstable hydroxides and uniformly dispersing or dissolving the hydroxides by stirring, after diluting in step 2.

4. The method according to claim 2, further comprising adding an aqueous solution of sulfate ion ($SO_4^{2-}$) after diluting in step 2.

5. The method according to claim 4, wherein the aqueous sulfate ion solution is an aqueous solution containing a sulfate compound selected from the group consisting of $H_2SO_4$, $TiOSO_4$, $FeSO_4$ and $CuSO_4$.

6. The method according to claim 4, wherein the aqueous sulfate on solution is in a concentration of not more than 0.08 M.

7. The method according to claim 4, wherein the aqueous sulfate ion solution is in a concentration of 0.03–0.08 M and is used to control a ratio between a rutile phase and an anatase phase in the titanium dioxide powder.

8. The method according to claim 2, where n the filtering and washing in step 4 are conducted with an aqueous alkaline halide solution of 0.1 M or higher.

9. The method according to claim 2, wherein the drying in step 4 is conducted at not more than 300° C. for 10–40 hours.

10. A method for preparing a rutile containing titanium dioxide powder, comprising:
   1) adding ice pieces or icy distilled water to pure titanium tetrachloride ($TiCl_4$) in an amount of less than the stoichiometric amount to give an aqueous titanylchloride solution of 1.5 M or higher (step 1);
   2) diluting the aqueous titanylchloride solution with distilled water, and one of ammonia water (25% diluted) at an amount of 1.4–3.7% (v/v) and an aqueous solution of sulfate ion ($SO_4^{2-}$) in a concentration of not more than 0.08 M to a Ti ion ($Ti^{4+}$) concentration of 0.1–1.2 M (step 2);
   3) obtaining precipitates of titanium dioxide from the diluted aqueous titanylchloride solution by standing for 2–20 hours at 15–70° C.; and
   4) filtering, washing and drying the above titanium dioxide precipitates to provide the rutile type titanium dioxide powder.

11. A photocatalyst material comprising a downy hair-shaped titanium dioxide ($TiO_2$) powder with a specific surface area of 130–200 $m^2/g$ wherein the material has a catalyst activity of at least 1.2 times a non-downy hair-shaped titanium dioxide.

* * * * *